United States Patent [19]

Beller

[11] Patent Number: 4,690,125
[45] Date of Patent: Sep. 1, 1987

[54] MESQUITE BURNING OUTDOOR COOKING DEVICE

[75] Inventor: Frank W. Beller, Aurora, Ill.

[73] Assignee: Belson Manufacturing Co., Inc.

[21] Appl. No.: 789,741

[22] Filed: Oct. 21, 1985

[51] Int. Cl.[4] .......................... A47J 37/00; F24B 3/00
[52] U.S. Cl. .................... 126/25 A; 126/1 F; 126/5 R; 126/147; 99/482
[58] Field of Search .............. 126/25 R, 25 A, 29, 126/1 R, 1 F, 26, 9 R, 147, 151, 148, 198; 110/336, 180; 99/482

[56] References Cited

U.S. PATENT DOCUMENTS

| | | | |
|---|---|---|---|
| 1,358,966 | 11/1920 | Marquardt | 126/1 F |
| 2,544,536 | 3/1951 | Mahnken et al. | 126/39 M |
| 2,797,680 | 7/1957 | Nagel | 126/39 M |
| 3,120,224 | 2/1964 | Divelbiss | 126/39 M |
| 3,699,876 | 10/1972 | Ellis | 126/25 R X |
| 3,769,901 | 11/1973 | Phillips | 126/25 X |
| 3,857,380 | 12/1974 | Hansman | 126/25 A |
| 3,959,620 | 5/1976 | Stephen, Jr. | 126/25 X |
| 4,553,523 | 11/1985 | Stohrer, Jr. | 126/25 R |
| 4,592,335 | 6/1986 | Beller | 126/25 |

Primary Examiner—Larry Jones
Attorney, Agent, or Firm—Lee, Smith & Zickert

[57] ABSTRACT

An outdoor cooking device capable of sustained use at elevated temperatures caused by the burning of mesquite charcoal, and the like. The device includes a plurality of liner sheet sections and a cooperative burning grate which form an inwardly spaced protective barrier adjacent the firebox side walls and bottom wall. The liner sheet sections and burning grate are independently removable and replaceable and cooperate to prevent heat degradation, or burnout, of the firebox which might otherwise result from cooking at the high combustion temperatures of mesquite charcoal, and the like.

13 Claims, 8 Drawing Figures

U.S. Patent  Sep. 1, 1987  Sheet 1 of 3  4,690,125
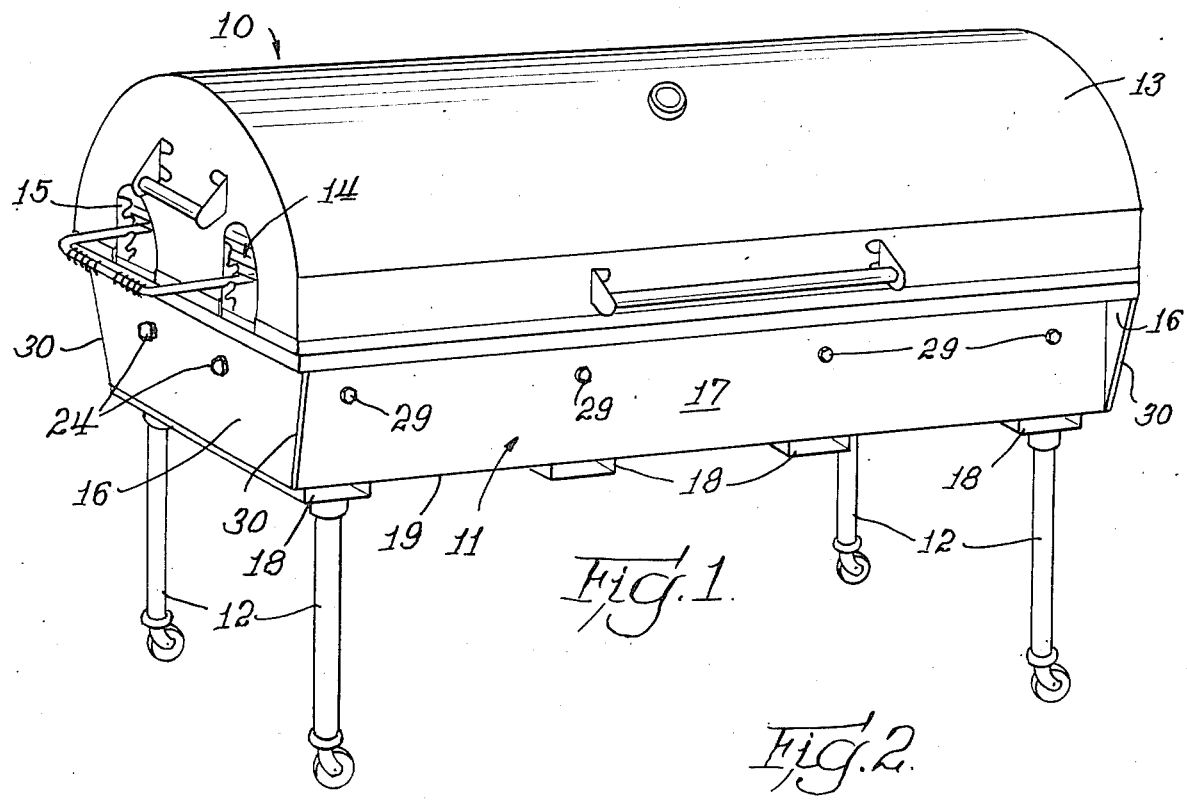
Fig. 1.
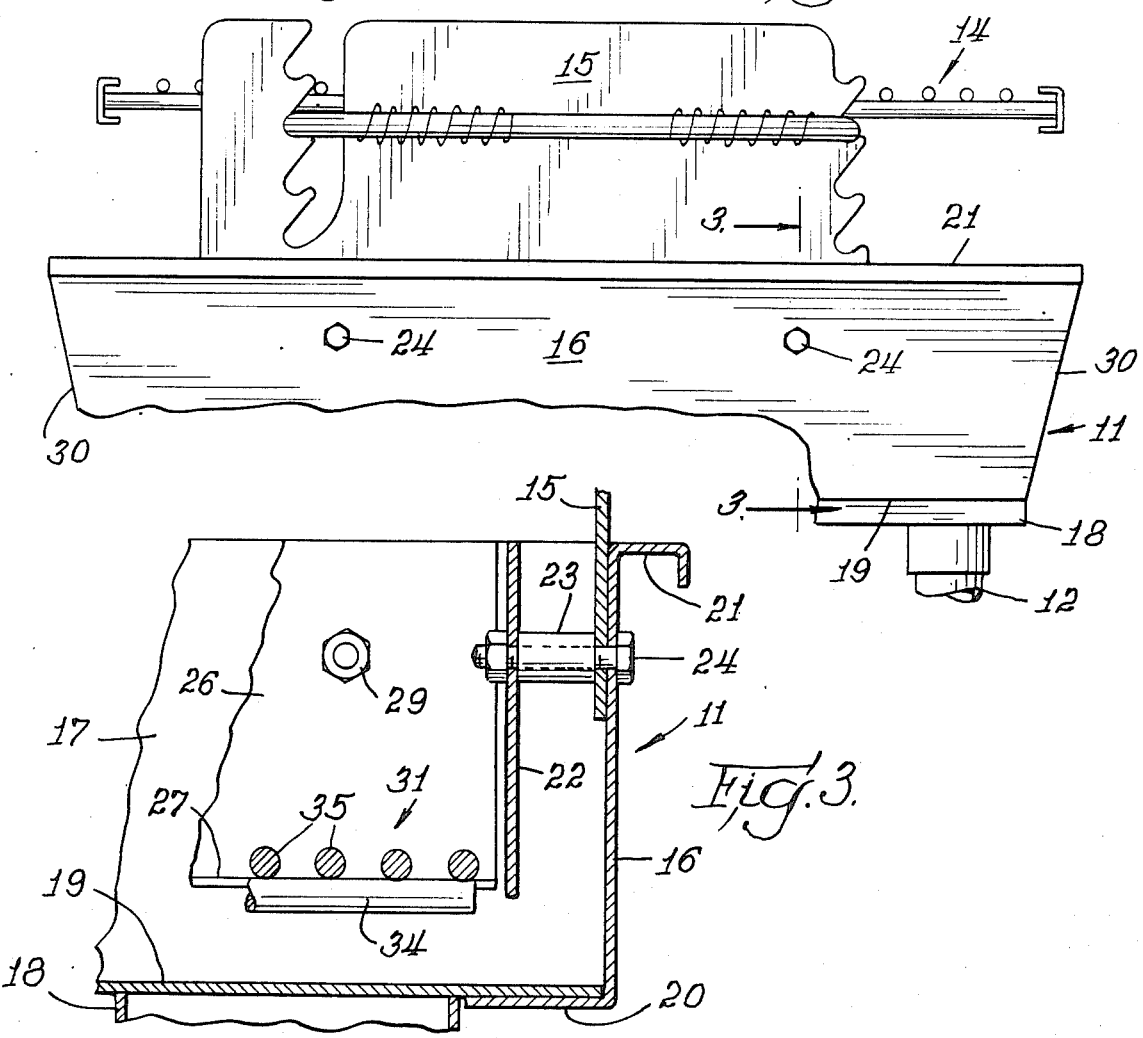
Fig. 2.
Fig. 3.

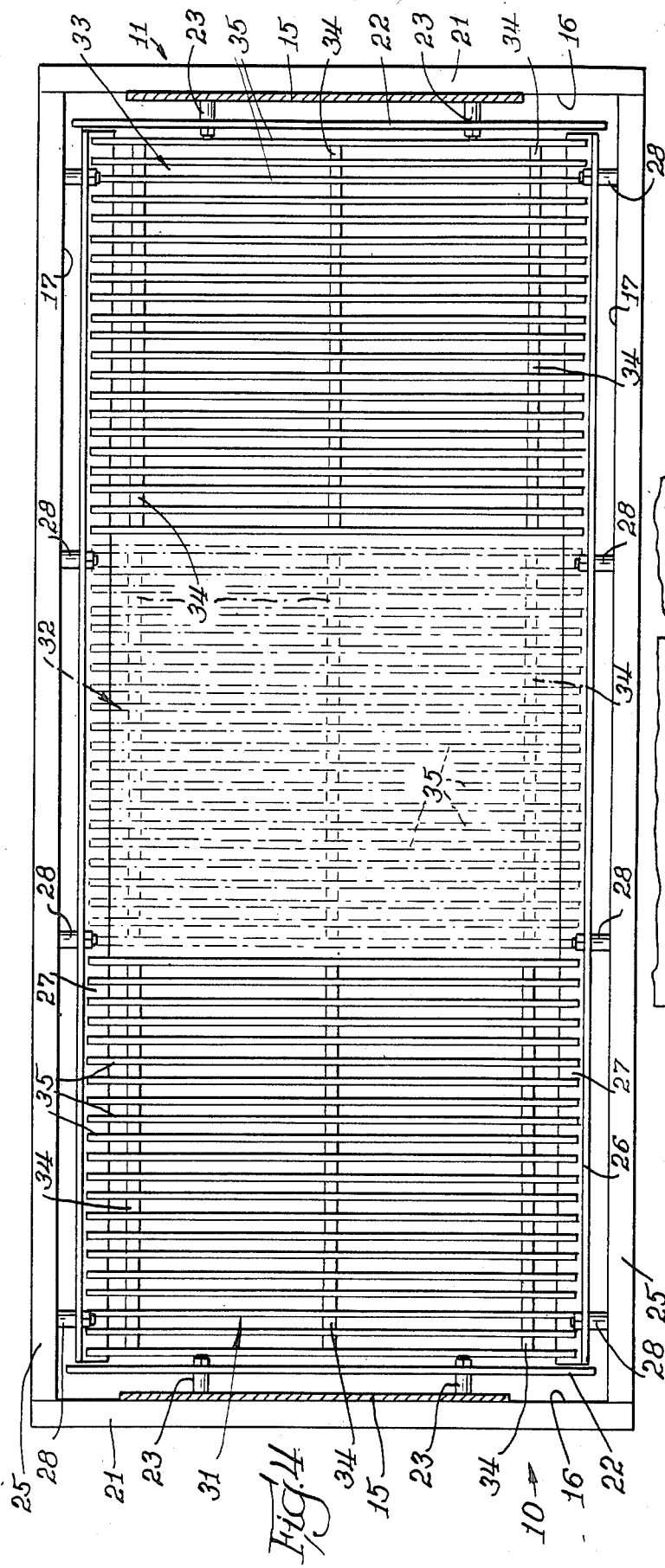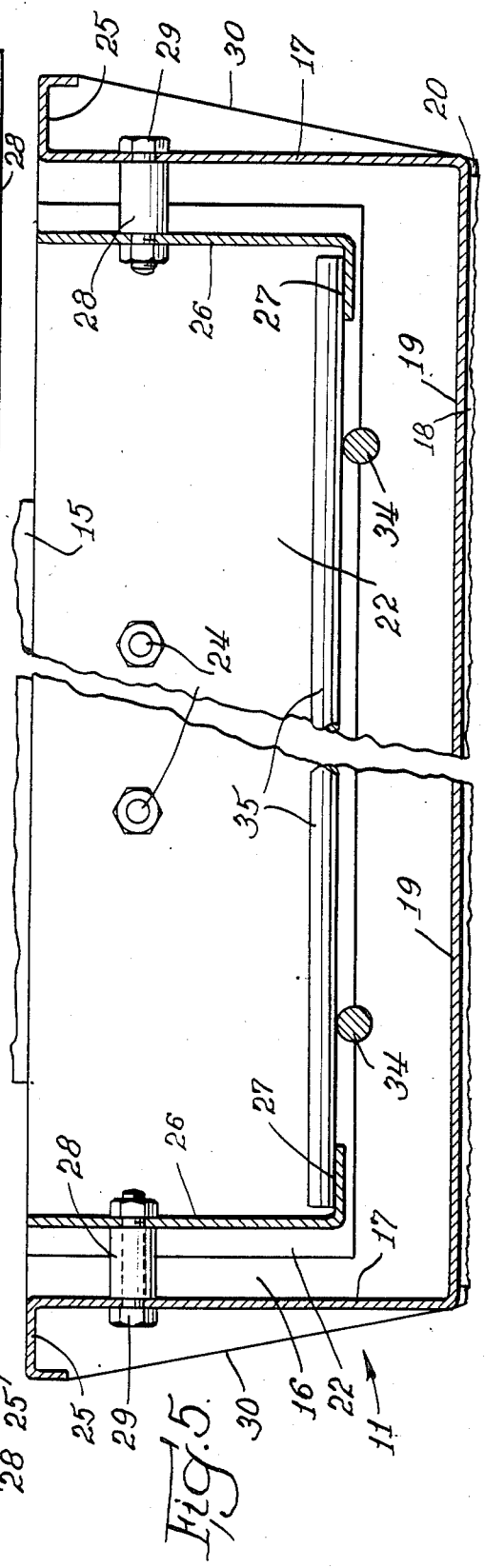

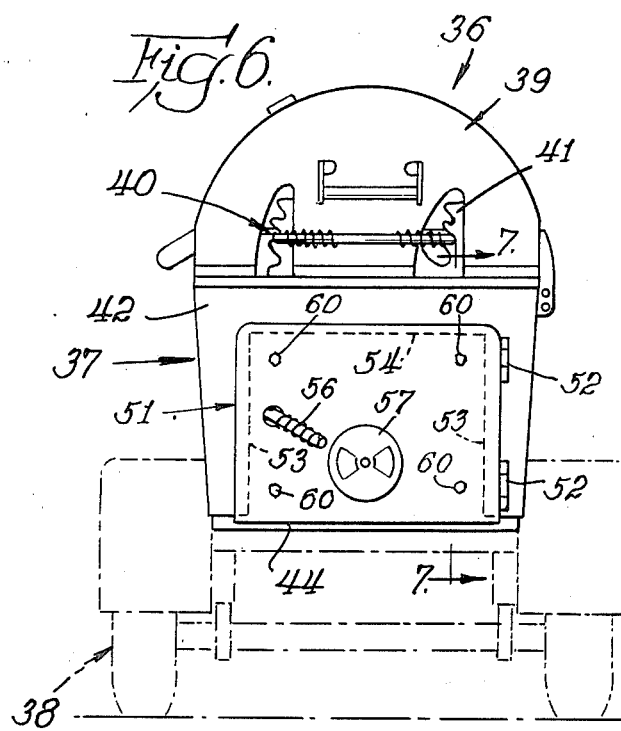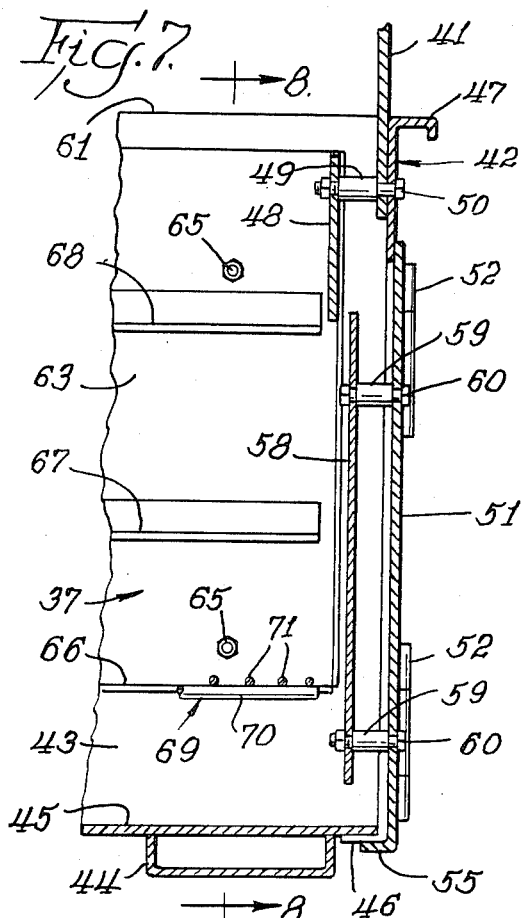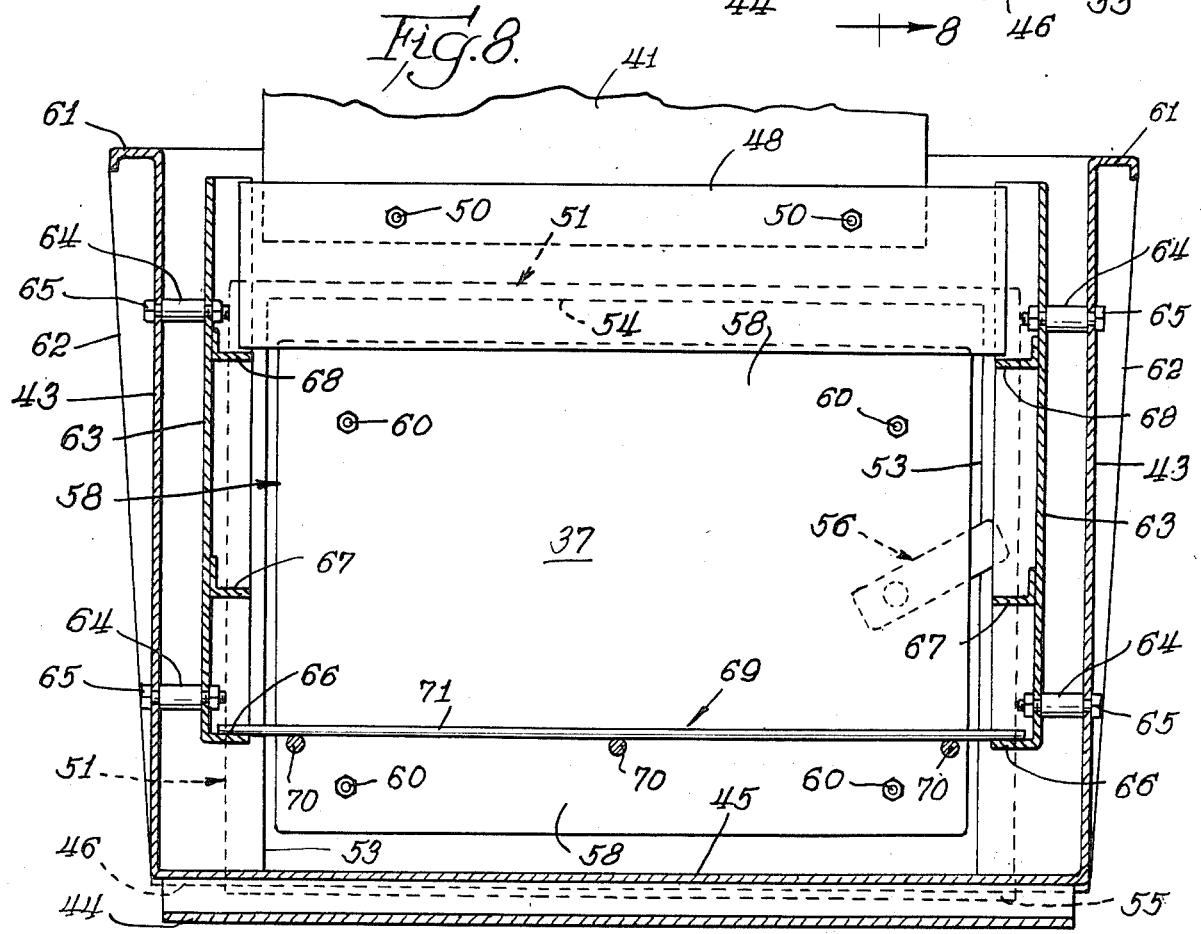

MESQUITE BURNING OUTDOOR COOKING DEVICE

BACKGROUND AND SUMMARY OF THE INVENTION

The invention relates to a large heat resistant outdoor cooking device capable of burning mesquite charcoal, and the like, at high temperatures by preventing burnout of the firebox walls.

A wide variety of fuel sources have been used in large volume outdoor cooking devices such as charcoal, wood, bottle gas and mesquite charcoal. Conventional oven designs can accommodate the combustion temperatures of charcoal and most woods. However, when materials that burn at higher temperatures, such as mesquite charcoal, are utilized, the heat created can cause the temperature to rise up to about 1500° F. within the firebox. In prior art cooking devices, burnout of the firebox walls has been a problem.

Recently, mesquite barbecuing has become very popular. Mesquite is a dry shrub that grows wild in the southwest United States and Mexico and is usually purchased in charcoal form for barbecuing. The hotter fire created by burning mesquite makes possible a quick searing of meat, for example, and thereby allowing a retention of more of the natural juices in the meat. Mesquite is acclaimed as providing a delicate sweet and smokey flavor to the barbecued food. Unfortunately, conventional barbecue grills and ovens are susceptible to the heat degradation caused by burning this material.

Heretofore, outdoor cooking devices have primarily relied upon using heavy gauge sheet steel for the firebox walls, which are sometimes treated with a heat resistant paint to prevent burnout. With the higher temperatures caused by mesquite and certain types of woods, such as hickory chips, oak, and the like, it is impractical to simply provide thicker firebox walls because temperature differentials cuasing hot spots can still create localized warpage and damage even though the heavier gauge materials are used. Additionally, the cost of heavier gauge sheet steel precludes the manufacture of a product that is economically competetive.

It would therefore be desirable to use a standard size sheet steel for the firebox, such as 12 gauge, but yet provide an insulating barrier between the firebox walls and the source of heat to avoid the burnout problem.

The present invention solves the problem of firebox burnout by providing heavy duty liner sheet means adjacent the firebox side walls and a cooperative burning grate for accommodating mesquite or the like, to be spaced safely above the bottom wall of the firebox.

The liner sheet means and grate are arranged whereby sections of each may be individually removed and replaced, if damaged, without the necessity of major repair to the firebox or the discarding of an entire cooking device should burnout occur. Additionally, the liner sheet means and burning grate are provided to be adjustable, in one form of the invention, whereby the combustible material may be disposed at different levels relative to a cooking grill assembly supported above firebox.

Should any one of the sections of liner sheet means or the grate become damaged, any one may be easily replaced and thus avoid previous repair practices of welding cover plates over burnout holes, such as occurs in prior art firebox designs for conventional cooking devices.

In summary, the invention provides for a mesquite burning outdoor cooking device having a firebox defined by four side walls and adapted to be optionally covered by a hinged lid. The bottom of the firebox comprises a generally planar bottom wall joined to the side walls and extending below a grill assembly supported above the side walls. Spaced interiorly from the firebox side walls, liner sheet means is provided whereby to define an insulative spacing between the firebox side walls and liner sheet means and wherein at each of the four firebox side walls, a section of the liner sheet means is separately removable for repair and replacement if needed. Opposing sections of the liner sheet means provide support shelf means for a burning grate, or a plurality of burning grate sections, to be arranged for the support of mesquite, or the like, at a safe distance above the bottom wall of the firebox in order to prevent hot spots from occuring on the bottom wall and avoid burnout. The burning grate is arranged to extend across substantially the entire surface area of the bottom wall and is supportively spaced inwardly of the liner sheet means whereby an insulative spacing is created adjacent to substantially all of the firebox interior surfaces.

In one embodiment of the invention, the firebox is relatively shallow, such as about six to eight inches deep, and a burning grate is provided to be arranged at a fixed elevation within the firebox. The embodiment provides for a portabile cooking device by including caster leg means extending below the firebox so that the cooking device may be easily moved.

In another embodiment, a deeper firebox is provided whereby a burning grate may be arranged at a plurality of elevations relative to the bottom wall of the firebox. In this embodiment, the depth of the firebox is preferably about 18 to 24 inches deep whereby to allow for the utilization of large wood logs to be burned inside the firebox. At opposite end walls of the firebox, hinged doors are provided whereby access to the interior of the firebox is achieved without distrubing a grill assembly above. This access provision allows for maintenace and also for the introduction of additional wood or mesquite when required during cooking. Sections of the liner sheet means are arranged along longer front and back walls of the firebox and spaced therefrom whereby to cooperate with transverse shorter sections of the liner sheet means arranged at the opposite end walls. The end wall liner sheet sections provide for the insulation of the doors and the end walls whereby the end walls and door are protected from the high heat while allowing the doors to be opened during cooking. The liner sheet means for this alternate embodiment of the invention similarly provides for individual replacement of liner sheet sections.

The alternate embodiment for the mesquite burning outdoor device may be made to be movable by the inclusion of caster leg means supportively extending below the firebox or, optionally, an automobiletype trailer may be employed wherein the firebox is supported by the trailer frame so that the cooking device may be transported long distances and to remote sites.

In all embodiments of the invention, the exterior surfaces of the firebox remains relatively cool to the touch, while burning mesquite charcoal at temperatures considerably higher than those normally experienced with charcoal or bottled gas so that the side walls of the firebox do not become so hot as to create a hazard to the cook or damage to the firebox.

BRIEF DESCRIPTION OF THE DRAWINGS

FIG. 1 is a perspective view of the mesquite burning outdoor cooking device of the invention including a grill assembly and a hood closed atop the firebox;

FIG. 2 is a partial end view of the outdoor cooking device shown in FIG. 1 having the hood removed;

FIG. 3 is a partial sectional view of FIG. 2 taken along line 3—3;

FIG. 4 is a top view of the outdoor cooking device of FIG. 1 having the hood and grill assembly removed to show the liner sheet means spaced from the firebox side walls and a plurality of burning grate sections arranged within the firebox;

FIG. 5 is a sectional view of FIG. 4 tkane along line 5—5;

FIG. 6 is an end view of an alternate embodiment of the invention showing an outdoor cooking device embodying the invention having a grill assembly and a hood arranged thereover, and, in phantom lines, an automobile-type trailer mounted thereunder for transport of the device;

FIG. 7 is a partial cross-sectional view of the outdoor cooking device shown in FIG. 6 taken along line 7—7; and, FIG. 8 is a cross-sectional view taken along line 8—8.

DESCRIPTION OF THE PREFERRED EMBODIMENT

With reference now made to the drawing, wherein like reference numerals in the figures are used to denote the same element throughout, FIGS. 1-5 shows one embodiment of the mesquite burning outdoor cooking device of the invention at reference numeral 10.

Cooking device 10 is comprised of a generally rectangular firebox 11 which is supported on caster legs 12. A closed hood 13 is disposed atop the firebox 11 such as may be desired during over-type cooking. A grill assembly 14 is arranged over the firebox 11 and is housed within the hood 13 when it is closed. The grill assembly 14 is supported at opposite ends of the firebox 11 by grill support panels 15. The hood and grill assembly form no part of the present invention and are provided for illustrative purposed in order to explain the function of the invention.

The firebox 11 is generally rectangular in plan and has side walls comprising a pair of opposing end walls 16, which are at the left and right sides of the cooking device 10 as shown in FIGS. 1 and 4, and a pair of transversely arranged opposing front and back walls 17. The firebox 11 is reinforced by channels 18 extending parallel to the end walls 16 and preferably weld-attached to a firebox bottom wall 9, which is in the illustrated embodiment, integrally formed with the opposing front and back walls 17, as best viewed in FIG. 5. The end walls 16 have, along their lower edges, inwardly bent flanges 20 which are affixed to the bottom wall 19, as shown in FIG. 3. At their upper edges, the end walls 16 have outwardly bent and rebent L-shaped edges 21 for rigidity and which also provide a closure surface for the hood 13, as shown in FIG. 1. The opposite ends of the front and back walls 17 are, in preferred form, connected to the firebox-inward faces of the end walls 16, such as by welding, whereby the firebox 11 has continuously joined side wall and bottom wall means.

In the disclosed embodiment, the side walls 16 and 17, and bottom wall 17, are 12 gauge sheet steel that is desirably painted with a heat resistant black enamel. For common heat sources, such as charcoal and most woods, the construction of the firebox 11 would be satisfactory to withstand the temperatures experienced and provide long use. However, when a hotter burning combustible material is chosen, such as mesquite charcoal, or certain woods, a firebox formed as shown may degrade over time as temperatures approach 1500° F. or higher. Accordingly, the walls 16 and 17 are insulated from the heat source by the provision of liner sheet means, preferably having separate sections protecting the walls 16 and 17. The liner sheet means is, however, not limited to separate sections at each wall and, alternatively, for example, the liner sheet means may be connected and comprise a single integral section extending around the side walls, or two L-shaped integral sections, each protecting one end wall 16 and one wall 17. The liner sheet means of the illustrative embodiment include end liner sheets, or sections, 22 arranged in opposing fashion adjacent end walls 16. The end liner sheets 22 are preferably formed of 7 gauge steel plate providing an insulative buffer between the end walls 16 and the heat source. Hollow cylindrical spacers 23 separate the end liner sheets 22 preferably at about at least one inch from the end walls 16. In the exemplary embodiment, the spacers 23 comprise one-inch long galvanized steel pipes having an inside diameter of $\frac{3}{8}''$. Nut and bolt assemblies 24, of a conventional design, extend through the spacers 23 and removably affix the end liner sheets 22 in generally parallel spaced relationship interiorly of the end walls 16, as shown in FIGS. 3 and 4. Additionally, the grill support panels 15 are secured generally at their lower portions against the end walls 16 by means of the spacers 23 and nut and bolt assemblies 24, best depicted in FIG. 3.

The front and back walls 17 also include along their upper edges outwardly bent and re-bent L-shaped rigidifying edges 25, which, in association with the L-shaped edges 21 of walls 16, form a rectangular peripheral closure surface for the hood 13. The front and back walls 17 are insulated by sections of the liner sheet means comprising liner sheets, or sections, 26 which are also preferably formed of 7 gauge steel plate to create a buffer from the heat source.

As best viewed in FIG. 4, it will be seen that in preferred form, the end liner sheets 22 abut the ends of the liner sheets 26 and are slightly longer than the distance between the opposingly faced liner sheet 26 in order to slightly sidewardly overlap them at the four corners of the rectangular shape. Thereby, a continuous vertical curtain-like configuration is formed by the liner sheet, or sections, 22 and 26 interiorly of the walls 16 and 17. The liner sheets 26 include opposing inwardly bend lower ends 27 which provide support shelf means as will be hereinafter described. Spacers 28, also comprising hollow cylindrical sleeves that are substantially identical to spacers 23, are utilized to arrange the liners 26 preferably parallel at about a one inch spacing from the front and back walls 17. Conventional nut and bolt assemblies 29 extend through the spaces 28 and removably affix the liner sheets 26 in this spaced relationship. It will be seen from FIG. 5 that the end walls 16 desirably include inwardly and downwardly tapered side edges 30 which extend from the ends of the upper L-shaped edges 21 toward the lower ends of the walls 17 and terminate at the lower flange 20, so that the width of the lower flange 20 is substantially the same as bottom wall 19.

Support shelves formed by the opposing lower bent ends 27 are provided for the accommodation of three burning grate sections 31, 32 and 33, shown in FIG. 4. The lower bent ends 27 of the liner sheets 26 extend interiorly of the firebox 11 at a height whereby the fire grate sections 31, 32 and 33 are positioned preferably at about at least one inch above the bottom wall 19. The grate sections 31, 32 and 33 include long grate support rods 34 extending longitudinally of the cooking device 10. Shorter transverse grate rods 35 are affixed onto the support rods 34, such as by welding, and extend between, and are removably supported by, the shelf support means formed by the lower bent ends 26, as is illustrated in FIG. 5. It will be observed that the shorter rods 35 are suited to receive thereon mesquite charcoal, wood, and the like, during cooking procedures. The grate sections 31, 32 and 33 are substantially identical, and thus interchangeable, as shown in FIG. 4. The sections 31,32 and 33 are fully removable independently of each other which also permits the cook to selectively employ a center, left, or right, position for the mesquite charcoal when smaller portions of food are to be cooked at the grill assembly 14. It will also be appreciated that cleaning, repair and maintenance of the interior of the firebox 11 are thereby easily achieved. The depth of the firebox 11 is relatively shallow, and in the preferred embodiment is about six to eight inches. With the utilization of a vertically adjustable grill assembly 14, the distance between the items to be cooked and the source of heat resting atop the burning grate sections 31, 32 and 33 may be varied.

The end liner sheets 22 have a vertical dimension whereby they extend slightly below the grate sections 31, 32 and 33. Thus, the liner sheets, or sections, 22 and 26 laterally extend to create an insulating barrier around the burning mesquite charcoal placed atop the grate sections 31, 32 and 33.

For durability and heat resistance, the grate sections 31, 32 and 33 are desirably made of round steel bars wherein the support rods 34 have about a ½ inch diameter and the shorter transverse grate rods 35 have about a ⅜ inch diameter.

The cooking device 10 further facilitates the individual replacement of the end liner sheets 22 and front and back liner sheets 26 by means of the removable spacers and nut and bolt assemblies. As noted, each of the individual grate sections 31, 32 and 33 may also be separately replaced. Thereby, the cooking device 10 provides versatility and economic benefits inasmuch as any one of these sections may be individually removed and replaced as might be needed. In the past, repair to firebox walls was implemented by welding additional steel plates over burned-out sections of the fire wall or by other rudimentary repair techniques, all of which the present invention now obviates.

With reference now made to FIGS. 6–8, an alternate embodiment of the invention is shown at an outdoor cooking device 36. Cooking device 36 is characterized by a deeper firebox 37 and also by the provision of access doors at opposite end walls of the firebox 37. In this alternate embodiment, the firebox 37 is preferably about 18 to 24 inches deep. The firebox 37 may be mounted on an automobile-type trailer 38, shown in phantom lines, whereby the device 36 may be transported long distances and to remote locations. Alternatively, caster legs, such as the legs 12 shown in FIG. 1, may be used.

A hinged hood 39 is arranged atop firebox 37 in similar fashion to the hood 13 of the cooking device 10. A grill assembly 40 is supported between grill support panels 41 and is arranged to reside interiorly of the hood 39 when closed over the firebox 37. The firebox 37 is shown to be generally rectangular in plan and has side walls comprised of left and right opposing end walls 42, and transversely connected longer front and back walls 43. Reinforcement channels 44 are arranged below the firebox 37 for rigidity and support. In preferred form, the reinforcement channels 44 are weld-engaged to a firebox bottom wall 45, which is integrally formed with, and thereby connects, the front and back walls 43, best viewed in FIG. 8. End walls 42 include, along lower edges thereof, inwardly bent flanges 46, which are also affixed, such as by welding, to the underside of the bottom wall 45, as shown in FIG. 7. As with the firebox 11, the opposite ends of the front and back walls 43 are connected generally at the corners of the rectangular shape to the firebox-inward faces of the end walls 42, by conventional means, such as welding, whereby the firebox 37 has continuously joined side wall and bottom wall means. The upper edges of the end walls 42 are outwardly bent and rebent to form L-shape rigidifying edges 47, which also provide a resting surface for the hood 39. The cooking device 36 includes liner sheet means preferably having separate sections thereof at the walls 42 and 43 for the prevention of heat degradation. For the insulative protection of the upper regions of the end walls 42, liner sheet means sections are provided in the form of upper end liner sheets, or sections, 48 arranged interiorly of the firebox 37. Hollow cylindrical spacers 49 are utilized to maintain a spacing of about at least one inch between the end walls 42 and the upper end liner sheets 48. Conventional nut and bolt assemblies 50 removably associate with the spacers 49 to secure the end liner sheets 48 at this spaced distance, as well as providing means for supporting the grill support panels 41, best depicted in FIG. 7.

In the illustrated embodiment, the opposing end liner sheets 48 extend downwardly from generally the elevation of L-shaped edges 47 for about ⅓ or less of the height of the end walls 42. Generally below the end liner sheets 48, the end walls 42 are shown to each have access and maintenance doors 51, which allow entrance to the firebox 37 at both ends of the cooking device 36. The doors 51 extend across a major portion of the end walls 42 and thereby allow the user to easily feed split logs and other large-sized portions of combustible materials into the interior of the firebox 37 both before and during cooking. The doors 51 are pivotable on the end walls 42 by means of hinges 52 mounted thereon in order to facilitate easy opening and closing. The openings for the doors are cut-outs from the end walls 42 and are defined on three sides by opposite vertical cut-out edges 53 and a horizontal cutout edge 54. The vertical edges 53 extend to the bottoms of the end walls 42 so that the door openings are downwardly open and the end walls 42 thereby have a generally upside-down horseshoe shape. The doors 51 are sized to overlap the edges 53 and 54 whereby to safely seal over the end walls 42. The bottom edges of the doors 51 terminate in inwardly bent lower end flanges 55 to sealingly close beneath the bottom of the firebox 37 and seal across the downwardly open bottom of the horseshoe-shaped end walls 42, as best viewed in FIG. 7. In the disclosed embodiment, the openings for the doors 51 are about 15 inches high and 19 inches wide to provide large access openings to the interior of the firebox 37. This size also permits the doors 51 to horizontally extend beyond the front and back of a burning grate 69, as will be explained. When closed, the doors may be secured by means of conventional door latches 56. To help create a draft for the fire, closable vents 57 are provided at each of the opposite doors 51, which may be adjusted to create a desired air flor and temperature within the firebox 37 for cooking. In the exemplary embodiment, the doors 51 are comprised of 7 gauge sheet steel and are protected from the intense heat caused within the firebox by sections of the liner sheet means in the form of door liner sheets, or sections, 58. The door liner sections 58 are spaced at about at least one inch interiorly of the doors 51 and are desirably of a height whereby to extend upwardly to slightly overlap the outward faces of the upper end liner sheets 48, as shown in FIG. 7. As would be clear, the height and width of the door liner sheets 50 are slightly less than those of the door opening so that there is clearance therebetween to permit the door opening so that there is clearance therebetween to permit the doors 51 to open with the liner sheets attached. The liner sheets 58 extend laterally to provide insulative coverage of the doors 51 and are also arranged to span the width of the burning grate 69 to thereby eliminate the need for iner sheet means to be placed over portions of the end walls 42 extending sidewardly from edges 53. The door liner sheets 58 are spaced from the doors 51 by means of hollow cylindrical spacers 59. Similarly, conventional nut and bolt assemblies 60 are associated through the spacers 59 to secure the door liner sheets 58 to the doors 51. The door liner sheets 58 freely swing with the doors 51 as they are opened and closed.

With reference to FIG. 8, it will be observed that the longer front and back walls 43 include upper bent and rebent L-shaped rigidifying edges 61, which also serve to provide a closed-position resting surface for the hood 39 in cooperation with the L-shaped edges 47 of the end walls 42. FIG. 8 also illustrates side tapers 62 for the end walls 42 which extend inwardly and downwardly from the ends of the upper L-shaped edges 47 toward the lower ends of the walls 43 and terminate at the lower flange 46 wherein the end walls 42 have a width, measured at the flanges 46, substantially the same as the firebox bottom wall 45.

With further reference to FIG. 8, it will be also noted that the front and back walls 43 are protected by sections of the liner sheet means comprising opposing liner sheets, or sections, 63 that are also preferably spaced at about at least one inch interiorly of the walls 43 by means of hollow cylindrical spacers 64. In similar fashion, nut and bolt assemblies 65 communicate through the spacers 64 and attach the liner sheets 63 to the walls 43. The liner sheets 63 are sized to extend slightly past the opposing upper end liner sheets 48, as shown in FIG. 7, whereby, in cooperating with door liner sheets 58, a curtain-like arrangement for the liner sheet means is provided to laterally protect the interior of the side walls 42, 43, and the doors 51 of the firebox 37.

The liner sheets 63 have inwardly bent flanges 66 at their lower edges, which provide support shelf means as will be explained. Spaced upwardly from the flanges 66 the opposing liner sheets 63 each include opposing L-shaped angle brackets 67 that provide a second level support shelf means. Spaced further upwardly along the liner sheets 63 is a second pair of opposing L-shaped angle brackets 68 which form a third support level. Thus, flanges 66 and brackets 67 and 68 provide, respectively, a low, middle and high shelf support position. The fire grate 69 may be placed at any of said support shelf positions for the accommodation of mesquite charcoal, or the like. The fire grate 69, similar to grate sections 31, 32 and 33, consists of longitudinal grate support rods 70 which are preferably welded to the underside of shorter transverse grate rods 71. The upper surfaces of the grate rods 71 provide support surfaces for the mesquite charcoal, wood, or the like. The ends of the grate rods 71 are supportably rested on the corresponding flanges 66, or brackets 67 or 68, at the chosen grate elevation. In FIG. 8, the grate 69 is arranged at the lowest position, with the ends of the grate rods 71 rested on the opposing flanges 66. While a single section for fire grate 69 is shown in the cross-sectional view of FIG. 8, it will be understood that the cooking device 36 may be provided with a plurality of grate sections 69 similar to the provision of grate sections 31, 32 and 33 shown for cooking device 10. Each would desirably be of the same length and width whereby to be interchangeable and independently removable.

The provision of the three shelf positions allows the fire grate 69 to be selectively arranged relative to the grill assembly 40. This adjustability is particularly advantageous when different amounts of combustible material are utilized or when materials of different combustion temperatures might be used for various cooking procedures. In cooperation with a vertically adjustable grill assembly 40, as shown, a variety of spaced relationships can thereby be obtained between the grate 69 and the grill assembly 40. Also, by providing a plurality of equal sized sections of grates 69, a different elevation for each grate section is made possible, such as might be desired when mesquite is used at one side, traditional charcoal at the other, and wood logs in the center.

While the cooking device 36 preferably includes access and maintenance doors 51 at both of the end walls 42, it will be appreciated that a single door 51 might optionally be provided at only one of the walls 42. In this optional arrangement, the other opposing wall 42 would be provided with a single end liner sheet in generally the same manner as is employed for the cooking device 10, but wherein the liner sheet would of course have a correspondingly greater height to accommodate the deeper firebox 37.

The upper end liner sheets 48, door liner sheets 58 and liner sheets 63 of the preferred embodiment are made of 7 gauge sheet steel, which material is well suited for long use and durability in high-temperature cooking.

The sections of the liner sheet means for the firebox 37 are each removable by the provision of the disengagable nut and bolt assemblies and spacers, as shown, whereby individual replacement may take place shoudl damage occur to any one. Thus, by the protection afforded by the liner sheet means and associated grate means, damage of, and thereby major repair to, the firebox side and bottom walls are avoided and the invention permits of continuous long use at high temperatures. As in the preferred embodiment for the burning grates 31, 32 and 33, the fire grate 69 of cooking device 36 comprises longitudinal support rods made of $\frac{1}{2}$ inch diameter steel rods, and shorter transverese grate rods 71 made of $\frac{3}{8}$ inch diameter steel rods, whereby the burning grate 69 is well suited for long use in a high temperature cooking enviornment.

It will be seen that for both the cooking devices 10 and 36, the end liner sheets 22, and door liner sheets 58, respectively, employed at opposite ends of the fireboxes, all extend downwardly to be positioned generally at, or below, the transverse rods of the burning grates, whereby, in cooperation with the liner sheets for the front and back walls, the liner sheet means assumes a curtain-like configuration that extends interiorly around the firebox walls to effectively insulate the walls from the intense heat created around and above the burning grate.

While particular embodiments and configurations for elements of the disclosed invention have been shown, the description is not to be taken as being limited thereto, but encompasses a broad range of equivalent falling within the claims appended hereto.

What is claimed is:

1. A high temperature outdoor cooking device suitable for use with hot burning materials such as mesquite charcoal, or equivalent, said cooking device comprising:
   a firebox having interconnected side walls and a bottom wall;
   a grill assembly means supportably arranged over the firebox for retaining items to be cooked;
   liner sheet means forming a curtain-like barrier inwardly of the side walls and comprising at least four separate unconnected liner sections each liner section associated with means for disengagenbly attaching it to and spacing it inwardly of a firebox side wall and wherein each said liner section is individually removable from the cooking device facilitating selective replacement of any one thereof without disengaging any of the others, said liner sheet means including opposing liner sections thereof having opposing shelf support means;
   grate means being supportable by said shelf support means within the firebox at a distance above the bottom wall of said firebox, said liner sheet means being arranged to laterally surround said grate means whereby to insulate said firebox side walls from material burning on said grate means, and wherein said grate means is freely removably from said support shelf means;
said cooking device being capable of combusting mesquite charcoal, or equivalent, as a heat source for extended use therewith whereby the liner sheet means protects the firebox side walls from heat degradation which might otherwise be caused by temperatures ranging up to about 1500° F.

2. A cooking device as claimed in claim 1 wherein said grate means comprising a plurality of burning grate sections, each separately supportable at said shelf support means wherein any one burning grate section is independently removable from said shelf support means.

3. A cooking device as claimed in claim 1 wherein the liner sections are formed of sheet steel, wherein the liner sections are thicker than said side walls.

4. A cookng device as claimed in claim 1 wherein the depth of the firebox is from about six inches to about twenty-four inches and wherein the burning grate means is supported at least about one inch above the bottom wall of the firebox.

5. A cooking device as claimed in claim 1 wherein the liner sheet means forming a curtain-like barrier between the firebox side walls and burning grate means and having an equal spacing from said sidewalls.

6. An outdoor cooking device capable of sustaining high cooking temperatures of up to about 1500° F., said cooking device comprising
   a firebox consisting of upstanding side walls and a bottom wall interconnecting the side walls at lower ends thereof;
   said firebox side walls having two opposingly faced shorter walls and two opposingly faced longer walls forming a generally rectangular configuration in plan, wherein the shorter walls are opposing end walls of the firebox and the longer walls are opposing front and back walls of the firebox;
   at least one of said end walls having a door opening cut-out therethrough, whereby exposing and allowing access to the interior of the firebox;
   at least one door means closably arranged with said door opening cut-out whereby to facilitate selective access to the interior of said firebox;
   liner sheet means comprising separate unconnected liner sections each associating with means either removably attaching it to, and spacing it fireboxinwardly of, a side wall or said door means, said liner sheet means providing an insulative barrier adjacent the firebox side walls and said door means;
   at least one liner section being spaced adjacent each end wall, each said front and back wall, and said door means; the liner sections spaced adjacent the opposing front and back walls having opposing shelf support means;
   each said liner sectin being individually removable from the cooking device facilitating selective replacement of any one thereof without disengaging any of the others;
   burning grate means for accommodating a combusting source of heat, said burning grate means being supportably arranged within the firebox at said shelf support means and spaced at an elevation above the bottom wall of said firebox;
   the liner section being spaced adjacent said door means extends downwardly into said firebox at least to the elevation of the burning grate means;
   wherein said firebox side walls and door means are insulated from high temperatures created by burning mesquite charcoal, or equivalent, at the burning grate means, whereby to prevent heat degradation of the firebox which might otherwise be caused by combustion temperatures ranging up to about 1500° F.

7. A cooking device as claimed in claim 6 wherein at the end wall opposite said door means, a single liner sheet extends downwardly to at least the elevatin of said grate means; and, at the end wall having the door opening cut-out, two separate liner sheets are provided, a first upper liner sheet is spaced from a portion of the end wall above and generally across said door cut-out opening and a second liner sheet is removably attached to and spaced from said door means, the second liner sheet having a portion extending upwardly a sufficient distance to vertically overlap said first upper liner sheet, and a portion extending downwardly to at least the elevation of said grate means.

8. A cooking device as claimed in claim 6 wherein said burning grate means comprises a plurality of substantially equal sized burning grate sections wherein said grate sections are interchangeable and are removable independently one from the other, and removable independently of said liner sheets.

9. A cooking device as claimed in claim 6 wherein said liner sheet sections being spaced adjacent said opposing front and back walls includes a plurality of opposing vertically spaced apart shelf support means defining a plurality of shelf support height positions wherein said burning grate means may be selectively located at any said shelf support position to provide varying the elevation thereof above the bottom wall of said firebox.

10. A cooking device as claimed in claim 6 wherein said liner sheet means are spaced at least about one inch from said firebox side walls and door means.

11. A cooking device as claimed in claim 6 wherein said liner sheet means form a lateral curtain-like barrier spaced inwardly of said side walls and door means, said liner sheet means being generally equally spaced from said side walls and door means.

12. An outdoor cookng device capable of sustaining high cooking temperatures of up to about 1500° F., said cooking device comprising:
a firebox consisting of upstanding side walls and a bottom wall interconecting the side walls at lower end thereof;
said firebox side walls having two opposingly faced shorter walls and two opposingly faced longer walls forming a generally rectangular configuration in plan, wherein the shorter walls are opposing end walls of the firebox and the longer walls are opposing front and back walls of the firebox;
wherein both said opposing end walls include door cut-out openings and door means closably arranged therewith, wherein access to the interior of the firebox may be obtained at opposite ends of said cooking device;
liner sheet means comprising individual liner sections that are separate and independently attached to be spaced firebox-inwardly of said side walls and said door means wherein there is one liner section at each said sidewall and door means providing an insulative barrier adjacent the firebox side walls and said door means;
said liner sections each associating with means for disengageably attaching it to a sidewall or door means in said spaced relationship;
the liner sections being spaced adjacent said opposing front and back walls have opposing shelf support means;
each said liner section being independently removable from the cooking device facilitating selective replacement of any one thereof without disengaging any one of the others;
burning grate means for accommodating a combusting source of heat within the firebox, said burning grate means being supportably arranged at said shelf support means and spaced at an elevation above the bottom wall of said firebox;
the liner section spaced adjacent said door means extends downwardly into said firebox at least to the elevation of the burning grate means;
wherein said firebox side walls and door means are insulated from high temperatures created by burning mesquite charcoal, or equivalent, at the burning grate means, whereby to prevent heat degradation of the firebox which might otherwise be caused by combustion temperatures ranging up to about 1500° F.

13. An outdoor cooking device capable of sustaining high cooking temperatures of up to about 1500° F., said cooking device comprising:
a firebox consisting of upstanding side walls and a bottom wall interconnecting the side walls at lower ends thereof;
said firebox side walls having two opposingly faced shorter walls and two opposingly faced longer walls forming a generally rectangular configuration in plan, wherein the shorter walls are opposing end walls of the firebox and the longer walls are opposing front and back walls of the firebox;
at least one of said end walls having a door opening cut-out therethrough, whereby exposing and allowing access to the interior of the firebox;
at least one door means closably arranged with said door opening cut-out whereby to facilitate selective access to the interior of said firebox;
liner sheet means comprising a plurality of independently removable, and separate, liner sections, the liner sections being unconnected to each other, each said side wall and door means arranged with a liner section being spaced firebox-inwardly thereof and thereby providing an insulative barrier adjacent the firebox side walls and said door means, said liner sections being removably fastened to said firebox side walls and door means by means of releasable fastening assemblies including spacer means, associated with each liner section, said spacer means spacing said liner sections inwardly of said firebox side walls and door means and each said liner section being removable at its respective releasable fastening assembly without removing any of the others;
the liner sheet sections being spaced adjacent said opposing front and back walls having oposing shelf support means;
burning grate means for accommodating a combusting source of heat within the firebox, said burning grate means being supportably arranged at said shelf support means and spaced at an elevation above the bottom wall of said firebox;
the liner section being spaced adjacent said door means extends downwardly into said firebox at least to the elevation of the burning grate means;
wherein said firebox side walls are insulated from high temperatures created by burning mesquite charcoal, or equivalent, at the burning grate means, whereby to prevent heat degradation of the firebox which might otherwise be caused by combustion temperatures ranging up to about 1500° F.

* * * * *

UNITED STATES PATENT AND TRADEMARK OFFICE
CERTIFICATE OF CORRECTION

PATENT NO. : 4,690,125
DATED : September 1, 1987
INVENTOR(S) : Frank W. Beller

Page 1 of 2

It is certified that error appears in the above-identified patent and that said Letters Patent are hereby corrected as shown below:

At Col. 1, line 40, please delete the word "cuasing" and insert therefor the word — causing — .

At Col. 2, line 42, please delete the word "distrubing" and insert therefor the word — disturbing — .

At Col. 3, line 17, please delete the word "tkane" and insert therefor the word — taken — .

At Col. 3, line 40, please delete the word "over-type" and insert therefor the word — oven-type — .

At Col. 3, line 46, please delete the word "purposed" and insert therefor the word — purposes — .

At Col. 7, line 59, please delete the word "cooperating" and insert therefor the word — cooperation — .

At Col. 8, line 58, please delete the word "shoudl" and insert therefor the word — should — .

At Col. 8, line 67, please delete the word "transverese" and insert therefor the word — transverse — .

At Col. 9, line 54, please delete the word "comprising" and insert therefor the word — comprises — .

UNITED STATES PATENT AND TRADEMARK OFFICE
CERTIFICATE OF CORRECTION

PATENT NO. : 4,690,125

DATED : September 1, 1987

INVENTOR(S) : Frank W. Beller

It is certified that error appears in the above-identified patent and that said Letters Patent is hereby corrected as shown below:

At Col. 10, line 54, please delete "elevatin" and insert therefor -- elevation --.

Signed and Sealed this

Nineteenth Day of July, 1988

Attest:

DONALD J. QUIGG

*Attesting Officer*  *Commissioner of Patents and Trademarks*